(12) United States Patent
Myoen et al.

(10) Patent No.: US 8,513,953 B2
(45) Date of Patent: Aug. 20, 2013

(54) POWER SUPPLY DEVICE AND METHOD FOR MAKING DECISION AS TO CONTACTOR WELD OF POWER SUPPLY DEVICE

(75) Inventors: Kohei Myoen, Hitachinaka (JP); Hiroyuki Yamai, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 394 days.

(21) Appl. No.: 12/862,221

(22) Filed: Aug. 24, 2010

(65) Prior Publication Data

US 2011/0084704 A1    Apr. 14, 2011

(30) Foreign Application Priority Data

Oct. 9, 2009  (JP) .................................. 2009-234733

(51) Int. Cl.
 *G01R 31/04* (2006.01)
(52) U.S. Cl.
 USPC ........... 324/538; 324/434; 324/420; 324/415; 324/418; 180/443; 180/65.21; 180/65.29; 180/65.31; 307/9.1; 307/10.1
(58) Field of Classification Search
 USPC ........................................................ 324/538
 See application file for complete search history.

(56) References Cited

U.S. PATENT DOCUMENTS

| | | | | |
|---|---|---|---|---|
| 7,242,196 B2 * | 7/2007 | Yudahira et al. | ............... | 324/420 |
| 7,368,829 B2 * | 5/2008 | Tezuka | ............................ | 307/9.1 |
| 7,468,565 B2 * | 12/2008 | Hoshiba | ........................ | 307/10.1 |
| 7,608,940 B2 * | 10/2009 | Osawa | ........................... | 307/10.7 |
| 7,964,985 B2 * | 6/2011 | Ozaki et al. | .................. | 307/10.1 |
| 8,063,506 B2 * | 11/2011 | Sakata et al. | ................. | 307/10.7 |
| 2002/0070608 A1 * | 6/2002 | Matsuki et al. | ................ | 307/9.1 |
| 2003/0102673 A1 * | 6/2003 | Nada | ........................... | 290/40 C |
| 2005/0253460 A1 * | 11/2005 | Nakanishi et al. | ............ | 307/10.1 |
| 2006/0021098 A1 * | 1/2006 | Tezuka | ............................ | 903/922 |
| 2007/0221627 A1 * | 9/2007 | Yugou et al. | .................. | 218/136 |
| 2008/0185999 A1 * | 8/2008 | Matsukawa et al. | ........... | 320/166 |
| 2009/0108674 A1 | 4/2009 | Ozaki et al. | | |
| 2009/0160249 A1 * | 6/2009 | Soma et al. | .................... | 307/9.1 |

FOREIGN PATENT DOCUMENTS

| | | |
|---|---|---|
| JP | 2000-134707 | 5/2000 |
| JP | 2007-295699 | 11/2007 |

* cited by examiner

*Primary Examiner* — Arleen M Vazquez
*Assistant Examiner* — Thang Le
(74) *Attorney, Agent, or Firm* — Antonelli, Terry, Stout & Kraus, LLP.

(57) ABSTRACT

A power supply device includes: a power supply; a first contactor and a second contactor that are connected between the power supply and a load; a voltage detection circuit that detects a voltage between a load side of the first contactor and a power supply side of the second contactor; and a control unit that sets the contactors to an open/closed state. In a state in which electrical power has not been supplied to the load, a voltage which is greater than zero and less than a voltage at the power supply is applied between a positive electrode and a negative electrode on the load side; and after controlling the contactors to an open state, the control unit makes a decision as to whether or not one of the contactors is welded based upon detection results of the voltage detection circuit.

5 Claims, 9 Drawing Sheets

POWER SUPPLY DEVICE AND METHOD FOR MAKING DECISION AS TO CONTACTOR WELD OF POWER SUPPLY DEVICE

INCORPORATION BY REFERENCE

The disclosure of the following priority application is herein incorporated by reference: Japanese Patent Application No. 2009-234733 filed Oct. 9, 2009.

BACKGROUND OF THE INVENTION

1. Field of the Invention

The present invention relates to a power supply device that includes a contactor which connects a power supply and a load and a method for making a decision as to weld of the contactor.

2. Description of Related Art

In a power supply device for a hybrid vehicle and the like, which converts output from a direct current power supply into alternate current through an inverter so as to drive an AC motor, a secondary battery is used as a DC power supply. A positive contactor is connected in series between positive electrodes of the secondary battery and the inverter, and a negative contactor is connected in series between negative electrodes of the secondary battery and the inverter. In addition, a precharge contactor is connected in parallel with the positive contactor through a resistor.

A capacitor for smoothing DC voltage is provided between the positive electrode and the negative electrode on the inverter side. Electrical power supply from the secondary battery to the inverter is carried out by at first setting the precharge contactor and the negative contactor to a closed state so that the inverter initially charges the capacitor, and, after holding the capacitor voltage close to that at the secondary battery, setting the positive contactor to a closed state.

There is a widely used technique in which a capacitor is thus charged so as to keep the inrush current low when the positive contactor is set to the closed state and prevent contact welding at the contactor. However, a contactor may be welded at a contact due to an arc struck in the contact upon an open/close operation or due to aging, and, if the contactors of both of the positive electrode and the negative electrode are welded, the secondary battery and the inverter can not be separated. Hence, a technique to make a decision as to contactor weld and processing to inhibit a close operation at the contactor when weld is detected are necessary.

For example, there is a technique for making a decision as to contactor weld such as that described in Japanese Laid-Open Patent Publication No. 2000-134707. In the technique, at the start of electrical power supply from a secondary battery, i.e., a DC power supply, to load, only a precharge contactor is set to a closed state initially, so that a decision is made as to weld of a negative contactor based upon the capacitor voltage at the time. If the negative contactor is welded, the capacitor voltage rises by just setting the precharge contactor to the closed state, and hence a decision can be made as to weld.

Following this, after the negative contactor is also set to the closed state so as to charge the capacitor to a predetermined voltage level, a decision is made as to weld of the positive contactor or the precharge contactor based upon the capacitor voltage when the precharge contactor is set to the open state. If the positive contactor or the precharge contactor is welded, the capacitor voltage does not drop, and hence a decision can be made as to weld.

However, the above conventional technique requires an open/close operation of the contactor for making a decision as to weld and requires charging the capacitor to the predetermined voltage level, and therefore it takes time before the decision-making is completed. While the negative contactor is set to the closed state so as to make a decision as to weld of the positive contactor and weld of the precharge contactor, the negative contactor may also have been welded by excessive current flowing thereinto due to the difference between the uncharged capacitor voltage and DC power supply voltage if the positive contactor is welded.

For this reason, in Japanese Laid-Open Patent Publication No. 2007-295699, at the start of electrical power supply from the DC power supply to the load, voltage of a power supply for accessories is boosted by a boost circuit, and the positive contactor or the negative contactor is set to the closed state with the capacitor voltage raised to the extent of the DC power supply voltage due to the boost, so that a decision is made as to weld of the negative contactor or the positive contactor based upon the change in the capacitor voltage at the time. The capacitor is fully charged when the positive contactor or the negative contactor is set to the closed state. Therefore, even if one of the contactors is welded, no excessive current is generated at the contactor set to the closed state.

However, that method requires the boost circuit for charging the capacitor voltage to the extent of the DC power supply voltage. In addition, since after the capacitor voltage is charged to the extent of the DC power supply voltage, the close operation of the contactor is performed and weld decision-making is carried out, it took time before the decision-making is completed.

SUMMARY OF THE INVENTION

The present invention intends to make a decision as to weld of a positive contactor and a negative contactor in a short period of time with a simple circuit configuration.

According to the first aspect of the present invention, a power supply device comprises: a power supply that supplies electrical power to a load; a first contactor that is connected between the power supply and the load, and connected to a positive electrode terminal side of the power supply; a second contactor that is connected between the power supply and the load, and connected to a negative electrode terminal side of the power supply; a voltage detection circuit that detects a first voltage between a load side of the first contactor and a power supply side of the second contactor or a second voltage between a power supply side of the first contactor and a load side of the second contactor; and a control unit that sets the first contactor and the second contactor to an open state and a closed state. In a state in which the electrical power from the power supply has not been supplied to the load, a voltage which is greater than zero and less than a voltage at the power supply is applied between a positive electrode and a negative electrode on the load side; and after controlling the first contactor and the second contactor to an open state, the control unit makes a decision as to whether or not one of the first contactor and the second contactor is welded based upon detection results of the voltage detection circuit.

According to the second aspect of the present invention, in the power supply device according to the first aspect, it is preferred that in a configuration in which the voltage detection circuit detects the first voltage, the control unit makes a decision that the first contactor has been welded if the first voltage is equal to or greater than a first threshold value, and makes a decision that the second contactor has been welded if the first voltage is equal to or less than a second threshold value, which is greater than zero and less than the first threshold value; and in a configuration in which the voltage detection circuit detects the second voltage, the control unit makes a decision that the second contactor has been welded if the second voltage is equal to or greater than a third threshold value, and makes a decision that the first contactor has been welded if the second voltage is equal to or less than a fourth threshold value, which is greater than zero and less than the third threshold value.

According to the third aspect of the present invention, in the power supply device according to the first aspect, it is preferred that a third contactor with which a resistor is connected in series is connected in parallel with the first contactor, and a capacitative element is connected between a positive electrode and a negative electrode on the load side.

According to the fourth aspect of the present invention, a method for making a decision as to contactor weld of a power supply device that includes a power supply that supplies electrical power to a load comprises: applying a voltage that is greater than zero and less than a voltage of the power supply between a positive electrode and a negative electrode on a load side of a first contactor and a second contactor, which are to be connected between the power supply and the load, in a state in which the electrical power from the power supply has not been supplied to the load; controlling the first contactor and the second contactor to an open state; detecting a first voltage between a load side of the first contactor and a power supply side of the second contactor or a second voltage between a power supply side of the first contactor and a load side of the second contactor; and making a decision as to whether or not one of the first contactor and the second contactor has been welded, based upon the first voltage or the second voltage detected.

According to the fifth aspect of the present invention, in the method for making a decision as to contactor weld of a power supply device according to the fourth aspect, it is preferred that in an event that the first voltage is detected, the decision is made that the first contactor has been welded if the first voltage is equal to or greater than a first threshold value, and the decision is made that the second contactor has been welded if the first voltage is equal to or less than a second threshold value, which is greater than zero and less than the first threshold value; and in an event that the second voltage is detected, the decision is made that the second contactor has been welded if the second voltage is equal to or greater than a third threshold value, and the decision is made that the third contactor has been welded if the second voltage is equal to or less than a fourth threshold value, which is greater than zero and less than the first threshold value.

DESCRIPTION OF PREFERRED EMBODIMENTS

First Embodiment

Figure 1:
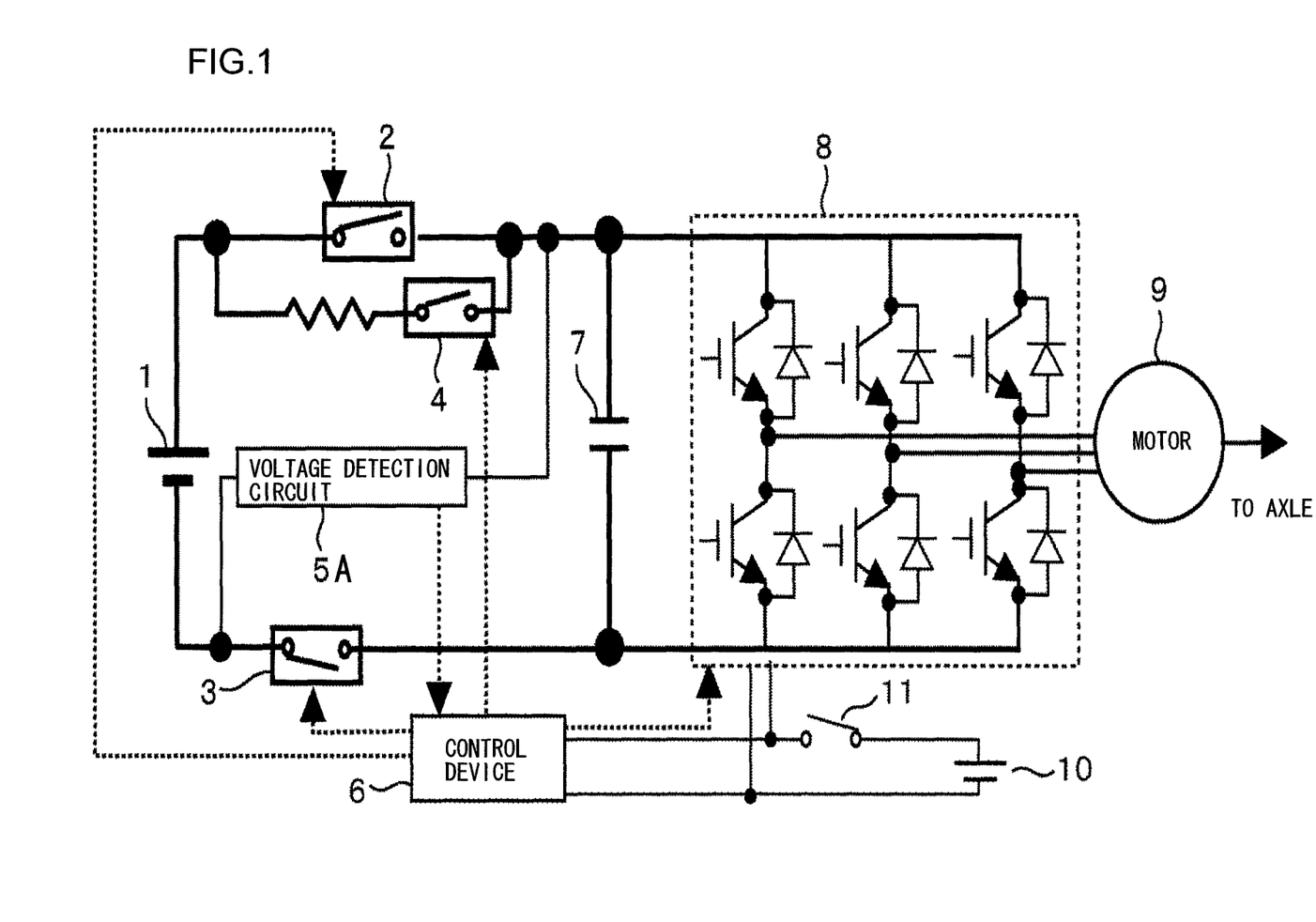
FIG. 1 is an outline structure diagram of a power supply device in the first embodiment and a vehicle system on which the power supply device is mounted.

FIG. 1 is a diagram explaining an outline of a vehicle system that includes a power supply device according to the first embodiment of the present invention and a motor. The vehicle system includes a main secondary battery 1, a positive contactor 2, a negative contactor 3, a precharge contactor 4, a voltage detection circuit 5A, a control device 6, a capacitor 7, an inverter 8, an AC motor 9, a secondary battery 10 for accessories, and an ignition switch 11.

In the vehicle system, such as in a hybrid vehicle, the AC motor 9, being connected to an axle of the vehicle, works as a power source and also works as an electric generator.

The main secondary battery 1 is a chargeable and dischargeable DC power supply such as a nickel-metal hydride battery or a lithium-ion battery.

The positive contactor 2 is connected in series between the positive electrode of the main secondary battery 1 and the positive electrode of the capacitor 7. The negative contactor 3 is connected in series between the negative electrode of the main secondary battery 1 and the negative electrode of the capacitor 7. The precharge contactor 4 is connected in parallel with the positive contactor 2 through a resistor.

At the start of electrical power supply from the main secondary battery 1 to a load, the negative contactor 3 and the precharge contactor 4 are initially set to a closed state so as to charge the capacitor 7. Once the capacitor 7 is fully charged, the positive contactor 2 is set to the closed state, and the precharge contactor 4 is set to an open state. At stopping the electrical power supply to the load, the positive contactor 2 and the negative contactor 3 are set to the open state.

The contactors 2, 3, and 4 are each controlled to the open state or the closed state according to an opening signal and a closing signal from the control device 6.

The voltage detection circuit 5A detects a voltage V1 between the capacitor 7 side of the positive contactor 2 and the main secondary battery 1 side of the negative contactor 3 and outputs a result thereof to the control device 6. When the negative contactor 3 is initially set to the closed state for electrical power supply to the load, the voltage V1 becomes equal to a terminal voltage V of the capacitor 7. It is therefore not necessary to separately provide a voltage detection circuit for monitoring the state of charge of the capacitor 7 after the precharge contactor 4 is set to the closed state.

The inverter 8 controls switching of an IGBT constituted by a three-phase upper arm and lower arm so as to convert DC electrical power at the main secondary battery 1 into three-phase AC and drive the AC motor 9.

The secondary battery 10 for accessories is normally mounted on a vehicle and its voltage is approximately 12V. At the start of electrical power supply to accessories, the ignition switch 11 is set to a closed state.

Figure 2:
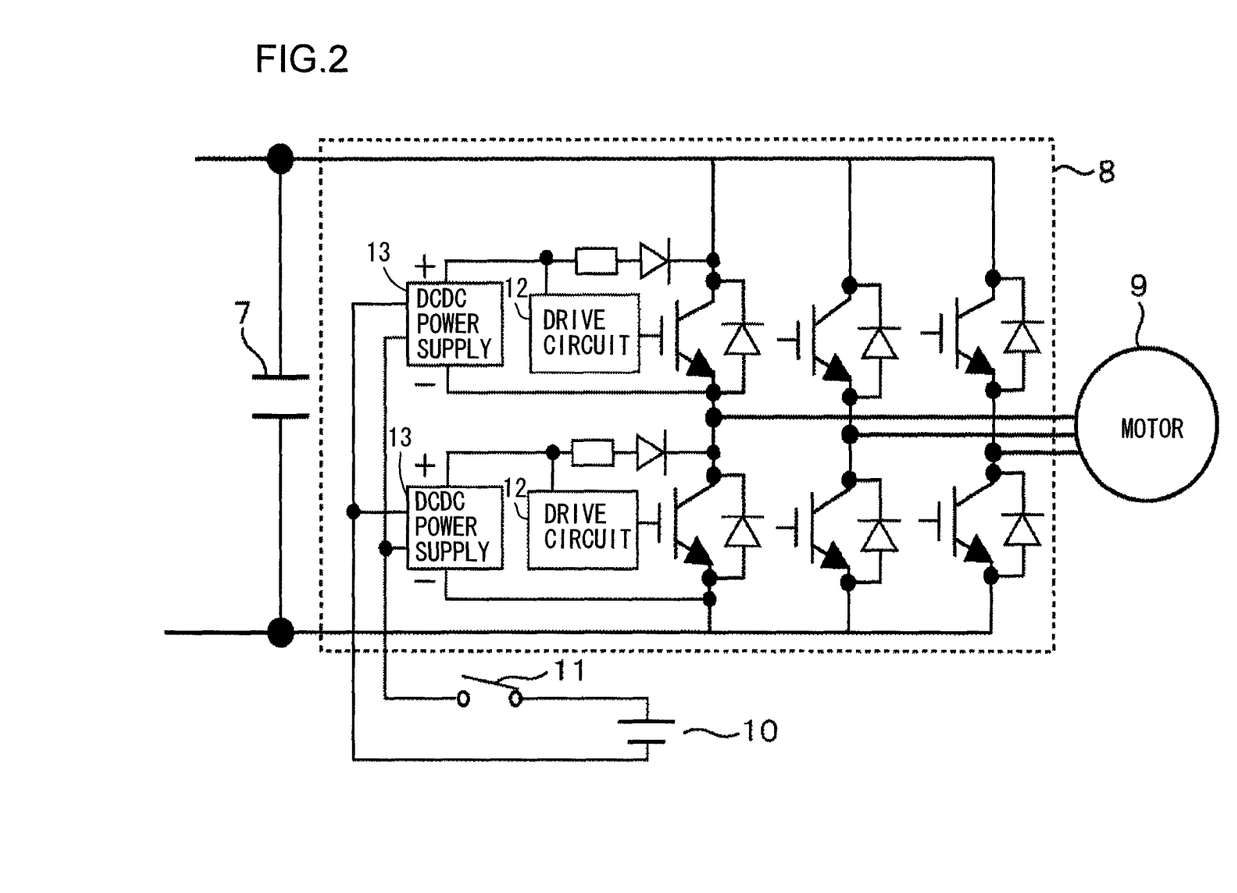
FIG. 2 is a structure diagram of a circuit in which output voltage of the DCDC power supplies 13 of the inverter 8 is applied to the capacitor 7 described in FIG. 1.

FIG. 2 shows a circuit configuration in which voltage is applied to the capacitor 7 even when each of the contactors is in the open state. Output voltage of DCDC power supplies 13 for drive circuits 12 of an IGBT normally mounted on the inverter 8 is connected between collectors and emitters of the IGBT through resistors and diodes, so that stable voltage can be applied to the capacitor 7 without using an expensive additional component.

The output voltage of the DCDC power supplies 13 is approximately 15V. Voltage is applied as described above at each of the upper arm and lower arm of the IGBT, so that the voltage V (15V×2=30V) of the capacitor 7 which is significantly higher than zero can be obtain. Although FIG. 2 presents the drive circuits 12 and the DCDC power supplies 13 only for one phase, there are those for three phases actually. Therefore, output voltage of the DCDC power supplies 13 for all the three phases may be connected between the collectors and the emitters of the IGBT through the resistors and the diodes. However, it is sufficient only for one phase. Since the output voltage of the DCDC power supplies 13 is generated by the secondary battery 10 for accessories, voltage is applied to the capacitor 7 only when the ignition switch 11 is in the closed state.

Figure 3:
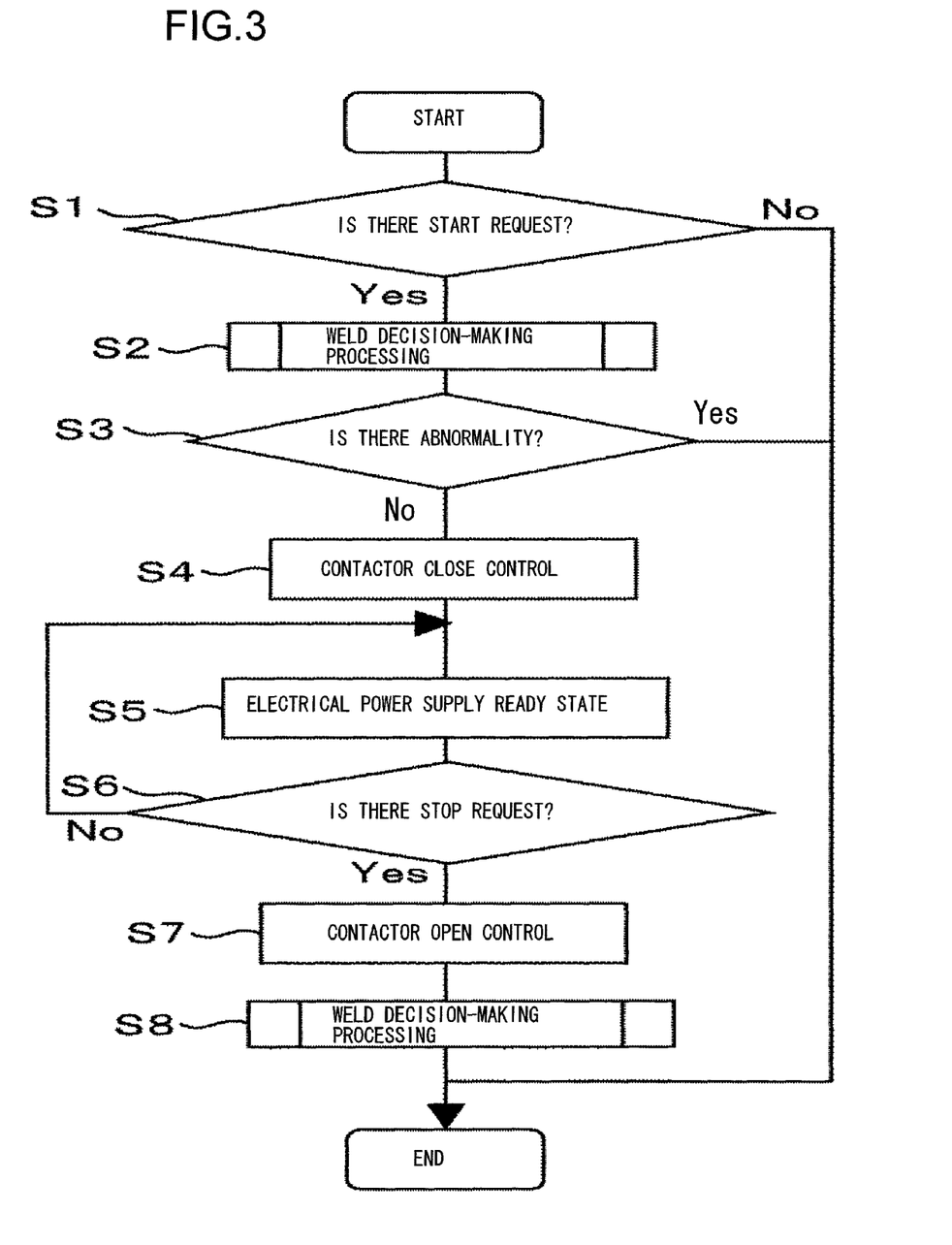
FIG. 3 is a flowchart from the start up to the end of the control device 6 described in FIG. 1.

The control device 6, constituted with a microcomputer, executes processing to perform weld decision-making as to each of the contactors based upon the voltage V1 detected by the voltage detection circuit 5A. FIG. 3 shows a flowchart from the start to the end of the control device 6.

In FIG. 3, after the present processing starts up, if the control device 6 confirms in a step S1 a start request for starting electrical power supply to the inverter 8, it carries out weld decision-making processing in a step S2. The weld decision-making processing is described below in detail with FIG. 4. Following this, if an abnormality has not been confirmed in a step S3, the control device 6 controls in a step S4 each of the contactors in the order described above for starting electrical power supply, and then the flow of control proceeds to a step S5, in which electrical power supply is in a ready state. If an abnormality has been confirmed in the step S3, the control device 6 stops the processing, and thus each of the contactors is not controlled to the closed state.

Upon confirmation of a stop request in a step S6, the control device 6 sets each of the contactors to the open state in a step S7 and then performs the weld decision-making processing in a step S8. Thus, weld decision-making can be carried out for each of the contactors even when the processing is stopped. If the control device 6 makes a decision that it is welded, it gives an abnormality notification, thereby improving safety in device maintenance or the like after the processing is stopped. Until a stop request is confirmed in the step S6, the control device 6 repeats the confirmation of a stop request in the step S6 in the electrical power supply ready state of the step S5. When the control device 6 carries out the weld decision-making processing in the step S8, the present processing ends.

Figure 4:
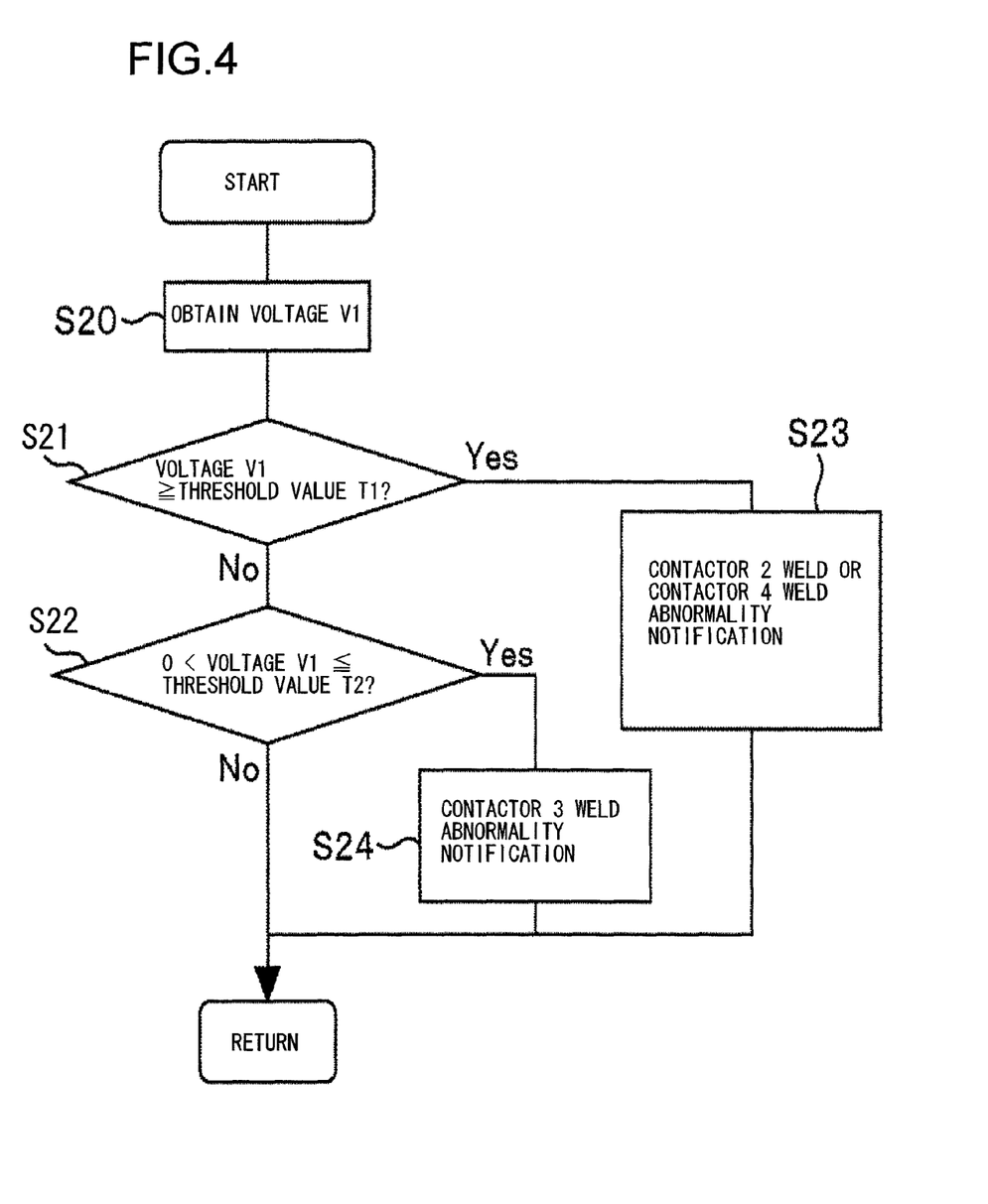
FIG. 4 is a flowchart showing the weld decision-making processing described in FIG. 3.

FIG. 4 provides the detail of the weld decision-making processing. The control device 6 initially obtains the voltage V1 in a step S20. Next, in the event that the voltage V1 is equal to or greater than a threshold value T1 in a step S21, the control device 6 makes a decision that the positive contactor 2 or the precharge contactor 4 is welded and gives an abnormality notification in a step S23, and then terminates the processing. Otherwise, if the voltage V1 is greater than zero and equal to or less than a threshold value T2 in a step S22, the control device 6 makes a decision that the negative contactor 3 is welded and gives an abnormality notification in a step S24, and then terminates the processing. Otherwise, the control device 6 terminates the processing.

The threshold value T1 described above is determined according to voltage at the main secondary battery 1. The threshold value T2 is determined based upon the voltage applied to the capacitor 7 using output voltage of the DCDC power supply 13 shown in FIG. 2. The threshold value T2 is greater than zero and less than the threshold value T1.

Figure 5:
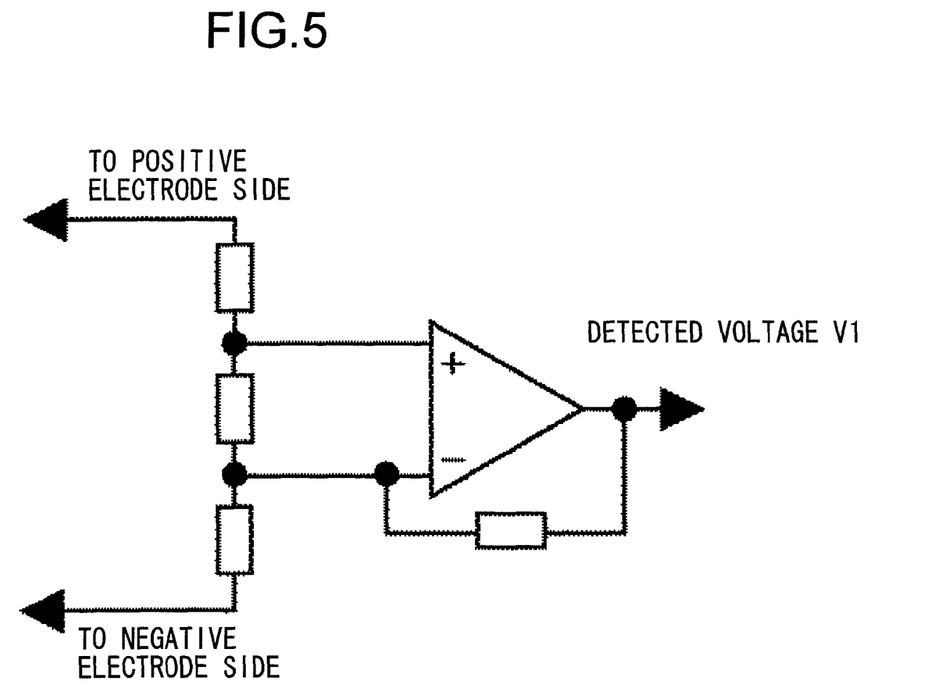
FIG. 5 is a circuit outline diagram of the voltage detection circuit 5A described in FIG. 1.

FIG. 5 is a circuit diagram outline of the voltage detection circuit 5A in the present embodiment, in which the voltage detection circuit is constituted with a differential amplifier. If any of the contactors are not welded and all of the contactors are in the open state, no difference occurs in voltage to be input to the differential amplifier, and accordingly the voltage V1 to be detected by the voltage detection circuit 5A becomes zero. If any of the contactors 2, 3, and 4 is welded, on the other hand, a difference occurs in voltage to be input to the differential amplifier due to the voltage at the main secondary battery 1 or the voltage applied to the capacitor 7, and accordingly the voltage V1 detected by the voltage detection circuit 5A becomes greater than zero, thereby enabling the weld decision-making described above.

It is to be noted that as described above, an example of the configuration in which output voltage of the DCDC power supply 13 is used as the voltage to be applied to the capacitor 7 before electrical power is supplied from the main secondary power supply 1 is explained. However, since the voltage to be applied to the capacitor 7 may be greater than zero and less than the voltage at the main secondary power supply 1, as variations described later, the present invention is not limited to the configuration example described above.

As above, according to the present embodiment, the voltage V at the capacitor 7 necessary to make a decision as to weld of each of the positive contactor 2 and the negative contactor 3 may be significantly lower than the voltage at the main secondary battery 1, and only the voltage V1 at the voltage detection circuit 5 and no other voltages may be detected. As a result, the decision-making processing has a simple structure that can complete the decision-making over a short period of time. In addition, since it is not necessary to set any of the positive contactor 2 and the negative contactor 3 to the closed state for the decision-making processing, excessive current is not generated at each of the contactors upon decision-making even without a boost circuit that raises the capacitor voltage V up to the DC power supply voltage.

Second Embodiment

Figure 6:
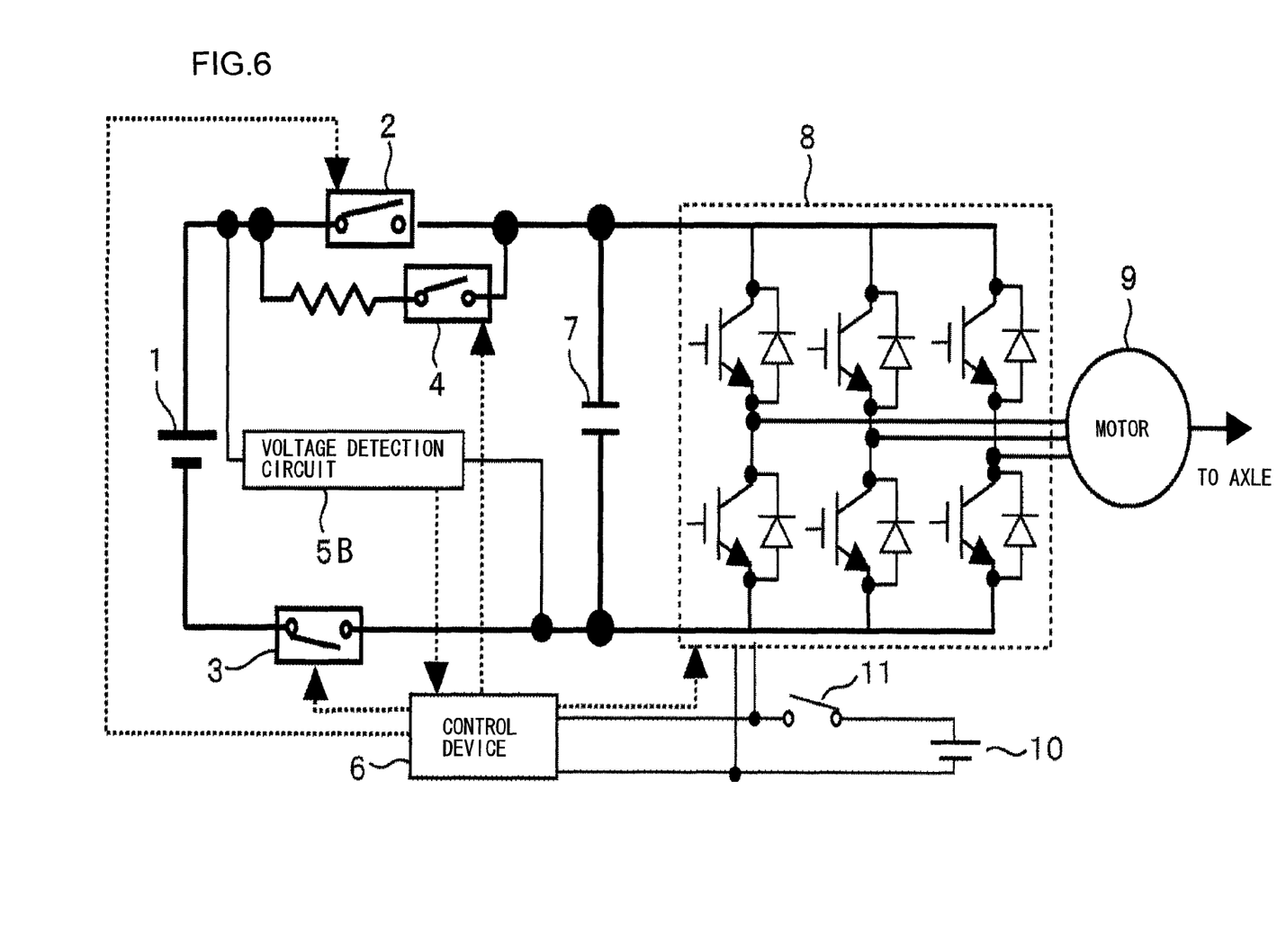
FIG. 6 is an outline structure diagram of a power supply device in the second embodiment and a vehicle system on which the power supply device is mounted.

The voltage detection circuit may have a structure as the voltage detection circuit 5B of the second embodiment of the present invention shown in FIG. 6, in which a voltage V2 between the main secondary battery 1 side of the positive contactor 2 and the capacitor 7 side of the negative contactor 3 is detected and the result thereof is output to the control device 6. The weld decision-making processing of this case is shown in FIG. 7 in detail.

Figure 7:
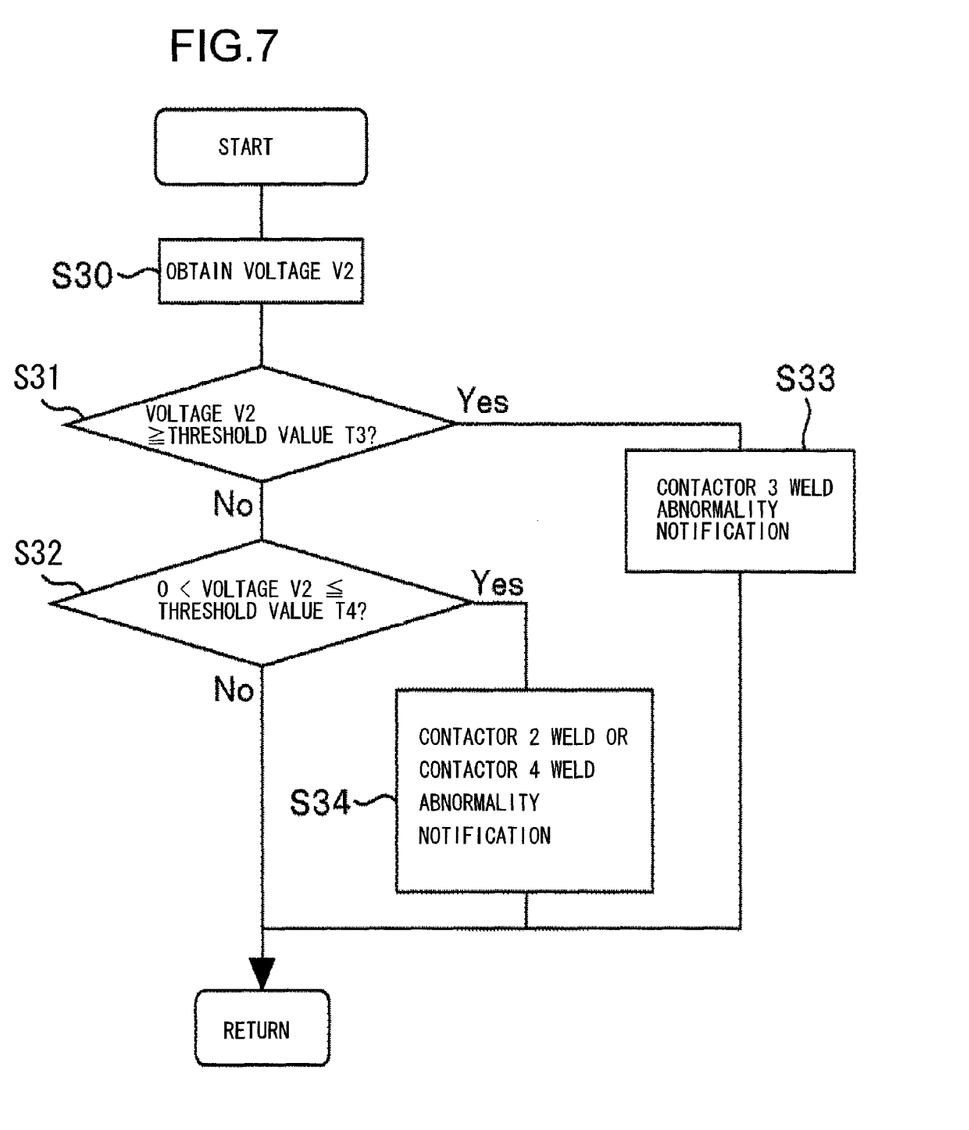
FIG. 7 is a flowchart showing the weld decision-making processing of the control device 6 described in FIG. 6.

In FIG. 7, the control device 6 initially obtains the voltage V2 in a step S30. Next, in the event that the voltage V2 is equal to or greater than the threshold value T3 in a step S31, the control device 6 makes a decision that the negative contactor 3 is welded and gives an abnormality notification in a step S33, and then terminates the processing. Otherwise, if the voltage V2 is greater than zero and equal to or less than the threshold value T4 in a step S32, the control device 6 makes a decision that the positive contactor 2 or the precharge contactor 4 is welded and gives an abnormality notification in a step S34, and then terminates the processing. Otherwise, the control device 6 terminates the processing. The threshold value T3 and the threshold value T4 may be determined in the same manner as the threshold value T1 and the threshold value T2 in the first embodiment described above.

—Variations—

As a method to apply voltage to the capacitor 7 even when each of the contactors in each of the embodiments described above is in the open state, output voltage of the DCDC power supply 13 may be applied to any one of the upper arm and the lower arm of a one-phase IGBT. In this case, voltage of approximately 15V, which is an output voltage of the DCDC power supply 13, is applied to the capacitor 7, weld decision-making can be carried out as described above, and the circuit configuration becomes simpler, thereby reducing rise in the cost.

Figure 8:
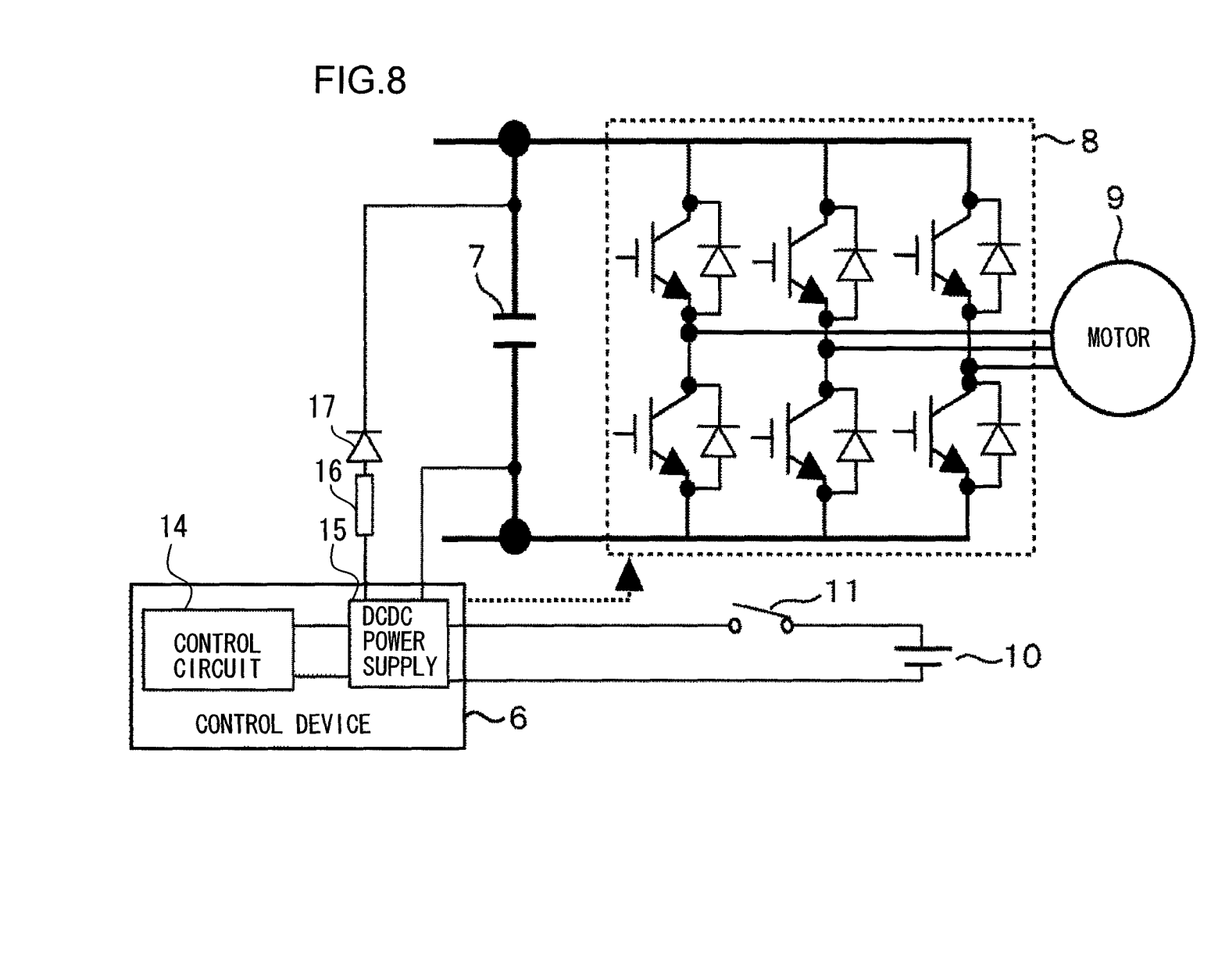
FIG. 8 is a structure diagram of a circuit in which output voltage of the DCDC power supplies 15 of the control device 6 is applied to the capacitor 7 described in FIG. 1.
Figure 9:
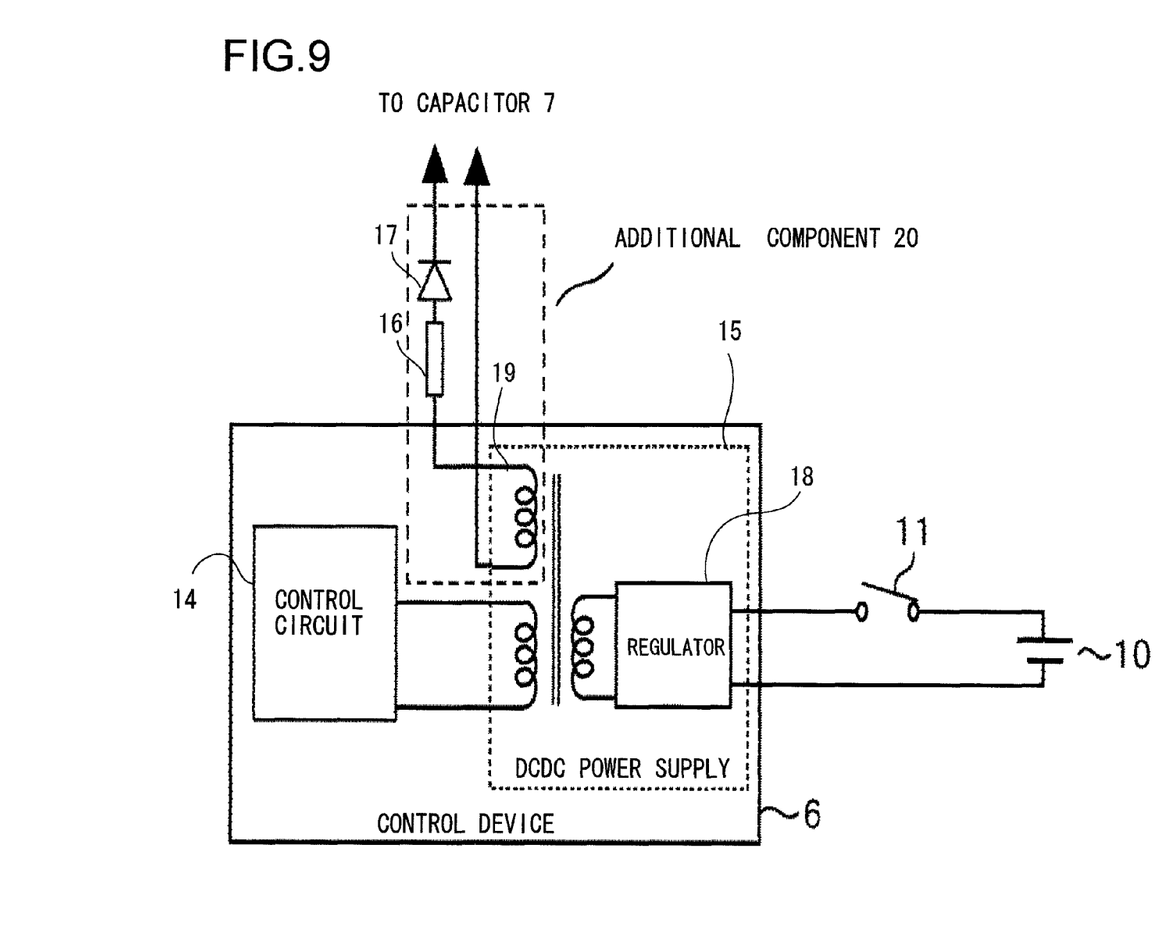
FIG. 9 is a circuit diagram of the additional component 20 to be added to the DCDC power supplies 15 so that output voltage of the DCDC power supplies 15 described in FIG. 8 is applied to the capacitor 7.

As a method to apply voltage to the capacitor 7 even when each of the contactors in each of the embodiments described above is in the open state, a DCDC power supply 15, which is normally mounted on the control device 6 so as to drive a control circuit 14 of the control device 6, can be used as shown in FIG. 8. By adding a circuit to derive output voltage of the DCDC power supply 15 and connecting the circuit to derive the output voltage with the capacitor 7 through a resistor 16 and a diode 17, it is possible to apply voltage to the capacitor 7, the circuit configuration does not become complicated, and an expensive additional component is unnecessary. An example of the circuit configuration is shown in FIG. 9. The DCDC power supply 15 includes a circuit 19 that derives output voltage described above other than a regulator 18. The circuit 19, the resistor 16, and the diode 17 are included in an additional component 20. In this case, voltage is applied to the capacitor 7 only when the ignition switch 11 is in the closed state. This method is effective in a circuit configuration in which not the voltage at the secondary battery 10 for accessories but the voltage at the main secondary battery 1 after the contactors are set to the closed state is used for input voltage to the DCDC power supply 13 for a drive circuit shown in FIG. 2.

In addition, the present invention can also be applied to a device that uses not a precharge contactor but a circuit that boosts the voltage at the secondary battery for accessories for the initial charge of the capacitor. In this case, a specific effect that enables weld decision-making without a close operation of the contactor can be produced.

Although, in the above explanation, the description is made in terms of an example in which the present invention is applied to a vehicle system on which a motor is mounted such as a hybrid vehicle, the embodiments of the present invention are not limited to the embodiments described above, and may be adopted in other power supply devices, each of which includes a power supply, a load, and a contactor.

The embodiments disclosed herein are exemplification and not restrictive in every respect. The technical scope of the embodiments of the present invention is defined by the claims, and the configurations described therein and all modifications in equivalence are also included within the technical scope of the embodiments of the present invention.

What is claimed is:

1. A power supply device, comprising:
    a power supply that supplies electrical power to a load;
    a first contactor that is connected between the power supply and the load, and connected to a positive electrode terminal side of the power supply;
    a second contactor that is connected between the power supply and the load, and connected to a negative electrode terminal side of the power supply;
    a voltage detection circuit that detects a first voltage between a load side of the first contactor and a power supply side of the second contactor or a second voltage between the power supply side of the first contactor and the load side of the second contactor; and
    a control unit that sets the first contactor and the second contactor to an open state and a closed state, wherein:
    in the open state in which the electrical power from the power supply has not been supplied to the load, a voltage which is greater than zero and less than a voltage at the power supply is applied between a positive electrode and a negative electrode on the load side; and
    after controlling the first contactor and the second contactor to an open state, the control unit makes a decision as to whether or not one of the first contactor and the second contactor is welded based upon detection results of the voltage detection circuit.

2. A power supply device according to claim 1, wherein:
    in a configuration in which the voltage detection circuit detects the first voltage, the control unit makes a decision that the first contactor has been welded if the first voltage is equal to or greater than a first threshold value, and makes a decision that the second contactor has been welded if the first voltage is equal to or less than a second threshold value, which is greater than zero and less than the first threshold value; and
    in a configuration in which the voltage detection circuit detects the second voltage, the control unit makes a decision that the second contactor has been welded if the second voltage is equal to or greater than a third threshold value, and makes a decision that the first contactor has been welded if the second voltage is equal to or less than a fourth threshold value, which is greater than zero and less than the third threshold value.

3. A power supply device according to claim 1, wherein:
    a third contactor with which a resistor is connected in series is connected in parallel with the first contactor, and a capacitative element is connected between a positive electrode and a negative electrode on the load side.

4. A method for making a decision as to contactor weld of a power supply device that includes a power supply that supplies electrical power to a load, comprising:
    applying a voltage that is greater than zero and less than a voltage at the power supply between a positive electrode and a negative electrode on load sides of a first contactor and a second contactor, which are to be connected between the power supply and the load, in a state in which the electrical power from the power supply has not been supplied to the load;
    controlling the first contactor and the second contactor to an open state;
    detecting a first voltage between a load side of the first contactor and a power supply side of the second contactor or a second voltage between a power supply side of the first contactor and a load side of the second contactor; and
    making a decision as to whether or not one of the first contactor and the second contactor has been welded, based upon the first voltage or the second voltage detected.

5. A method for making a decision as to contactor weld of a power supply device according to claim 4, wherein:
    in an event that the first voltage is detected, the decision is made that the first contactor has been welded if the first voltage is equal to or greater than a first threshold value, and the decision is made that the second contactor has been welded if the first voltage is equal to or less than a second threshold value, which is greater than zero and less than the first threshold value; and in an event that the second voltage is detected based upon the detection result, the decision is made that the second contactor has been welded if the second voltage is equal to or greater than a third threshold value, and the decision is made that the first contactor has been welded if the second voltage is equal to or less than a fourth threshold value, which is greater than zero and less than the third threshold value.

* * * * *